Aug. 6, 1946. R. T. SCHOLES Re 22,776

RAIL FASTENING MEANS

Original Filed Dec. 11, 1942

Inventor

R. T. Scholes,

By D. P. Wolhaupter

Attorney

Reissued Aug. 6, 1946

Re. 22,776

UNITED STATES PATENT OFFICE 22,776

RAIL FASTENING MEANS

Richard T. Scholes, Hinsdale, Ill.

Original No. 2,385,032, dated September 18, 1945, Serial No. 468,700, December 11, 1942. Application for reissue January 5, 1946, Serial No. 639,244

4 Claims. (Cl. 238—349)

This invention relates to resilient fastening devices for railway rails, and has particular reference to improvements in resilient fastening devices of the type described and claimed in my prior Patents Nos. 2,218,156 of October 15, 1940, and 2,257,077 of September 23, 1941.

As in the case of the rail fastening devices described and claimed in my said prior patents, the instant rail fastening device comprises a clip in the form of a spring plate which bears at or adjacent to its inner end upon the base flange of the rail and at or adjacent to its outer end upon the tie, tie plate or other rail support; which is designed to be fastened by fastening means exerting force downwardly upon the medial portion thereof; and which has a normal form such that when it initially is applied in its unflexed and unstressed condition its medial portion has a predetermined clearance from or spacing above the rail support whereby, upon application of the fastening means and consequent downward flexing of the medial portion of said plate until it is positively stopped by contact with the rail support, a predetermined amount of downwardly applied spring pressure is caused to be applied to the rail flange to hold the rail yieldably seated upon its support. A very material and important advantage thereby attained is that all of a number of the fastening devices applied to a rail exert substantially equal holding forces upon the rail without expert attention being required to attain that result.

Special objects of the instant invention are: (1) to provide a fastening device of the character stated according to which the spring plate is so designed and fastened as to serve effectively to hold the rail upon its support while acting yieldably to resist the normal amount of wave motion of which the rail naturally partakes in service, and to serve positively to resist any tendency of the rail to move upwardly from its support in excess of the upward movement thereof incident to its natural wave motion, whereby the natural wave motion of the rail desirably is permitted to pass through the rail without undesirable restraint and yet any possibility of overturning of the rail effectively is avoided; and (2) to provide novel means to insure maintenance of a predetermined operative relationship between the spring plate, the rail and the rail support.

With the foregoing and other objects in view, which will become more fully apparent as the nature of the invention is better understood, the same consists in a rail fastening device embodying the novel features of construction, combination and arrangement of parts as will be hereinafter more fully described, illustrated in the accompanying drawing and defined in the appended claims.

In the accompanying drawing, wherein like characters of reference denote corresponding parts in related views.

Figure 1:
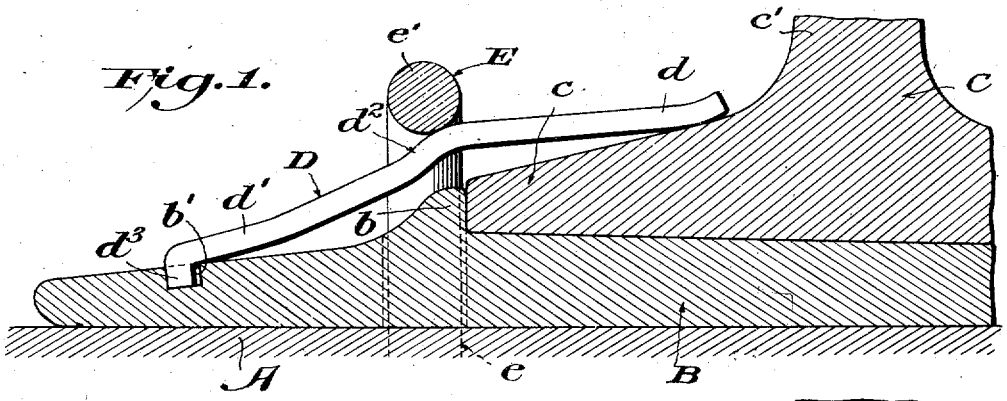
Figure 1 is a cross sectional view through a rail and its support showing the spring plate of the improved rail fastening device in its initially applied position prior to being fastened.

Referring to the drawing in detail, A designates a portion of a cross tie, B designates a portion of a tie plate seated upon said cross tie, C designates a part of the base portion of a rail seated upon said tie plate, D designates the spring plate or clip of the instant rail fastening device, and E designates a fastener for said spring plate.

The plate D preferably is formed from spring steel and preferably is rectangular in shape, being of any suitable width and thickness and of a length to extend, in overlying relationship to the base flange *c* of the rail and the tie plate B, from a point adjacent to the web *c'* of the rail to a point spaced any suitable distance outwardly from the usual upstanding rib or shoulder *b* of the tie plate against which the outer edge of the base flange *c* of the rail abuts.

By a rolling or pressing operation or in any other suitable manner the plate or clip D normally is arched a suitable amount as viewed in side elevation so that when it initially is applied in overlying relationship to the base flange *c* of the rail and the tie plate B with its inner end resting on said base flange *c* near the web *c'* of the rail and its outer end resting on the tie plate at a point spaced a suitable distance outwardly from the rib or shoulder *b*, its medial portion is spaced a suitable distance above said rib or shoulder *b*, as shown in Fig. 1. This arching of the plate D is effected, not by a regular curve, but by deflecting the medial portion of said plate upwardly a slight amount, leaving its inner and outer end portions *d* and *d'*, respectively, substantially straight, and by stepping its medial portion, which overlies the rib or shoulder $b$, upwardly and inwardly as indicated at $d^2$.

The fastener E preferably is in the form of a staple, the legs $e$, $e$ of which extend downwardly into the cross tie A through holes in the tie plate B directly adjacent to the outer edge of the rail base flange $c$ and the bight or cross bar connecting portion $e'$ of which extends transversely across the medial portion of the plate D in overlying relationship to the upwardly and inwardly stepped part $d^2$ thereof, and also disposed above and in the vertical plane of the rib or shoulder $b$ of the tie plate. Accordingly, by driving the staple E into the tie A, the medial portion of the plate D is flexed downwardly until its offset part $d^2$ contacts with the rib or shoulder $b$ of the tie plate and thereby is brought to a positive stop and thereby a predetermined amount of spring energy, depending upon the amount of normal arching of said plate, is stored in said plate so that its inner end portion $d$ exerts yieldably a definite and predetermined force downwardly upon the base flange $c$ of the rail to hold the rail yieldably seated upon the tie plate. In this connection it will be observed by reference to Fig. 2 that when the plate D is at its limit of downward flexure with its offset part $d^2$ in engagement with the rib or shoulder $b$, only the extreme inner end of the portion $d$ of said plate is in contact with the base flange $c$ of the rail and that, from the extreme inner end of said portion $d$ to the outer edge of the rail, said portion $d$ is spaced upwardly from said base flange $c$. This spacing is at least equal to, but not materially greater, than the amount of upward and downward movement of which the rail partakes as a result of its natural and normal undulating or wave motion in service. Accordingly, the natural and normal amount of wave motion of which the rail partakes in service, is free to pass through the rail resisted only by the yieldable holding force exerted downwardly upon the base flange $c$ of the rail by the inner end portion $d$ of the plate D. Due, however, to the fastener E being applied to said plate D directly adjacent to the outer edge of the base flange $c$ of the rail, the part of the inner end portion $d$ of the plate D which overlies the outer edge portion of the base flange $c$ of the rail constitutes a solid abutment limiting upward movement of the rail relative to the tie plate, and since the spacing of said inner end portion $d$ above the outer edge portion of the base flange $c$ of the rail is not materially greater than the maximum upward movement of which the rail partakes as a result of its natural and normal wave motion in service, any possibility of overturning of the rail thereby effectively and positively is avoided. Moreover, despite the positive stop against excessive upward or overturning movement of the rail afforded by the medial portion of the plate D, the inner end portion $d$ of said plate by virtue of its length and engagement with the base flange $c$ of the rail adjacent to the rail web $c'$ is freely flexible in response to the wave motion of the rail so as not unduly to resist such motion.

Figure 2:
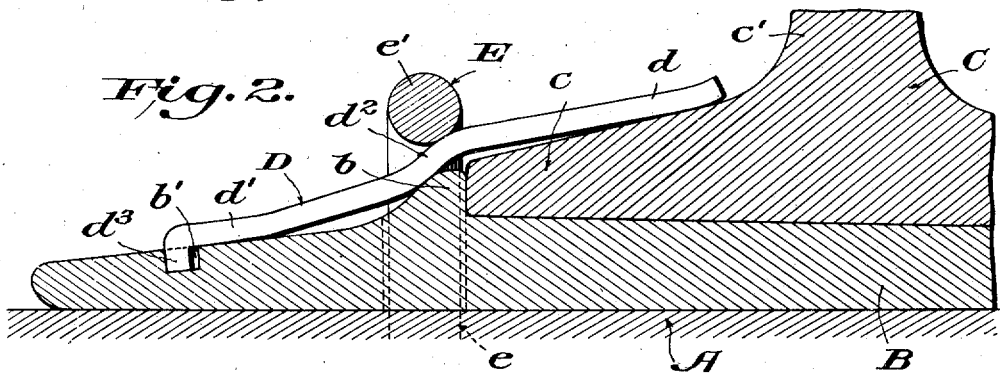
Figure 2 is a view similar to Fig. 1 showing the spring plate in its finally applied, spring energized position.
Figure 3:
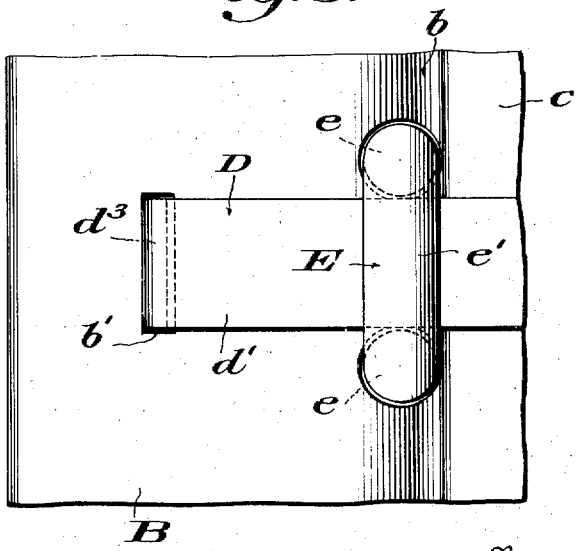
Figure 3 is a top plan view of the assembly shown in Figs. 1 and 2.
Figure 4:
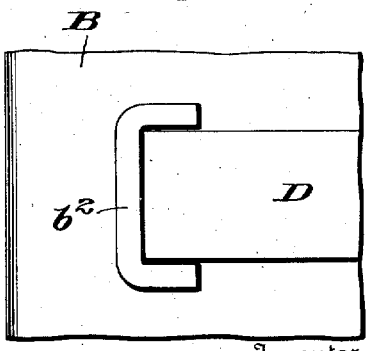
Figure 4 is a view similar to Fig. 3 illustrating an alternative form of means for maintaining a predetermined operative relationship between the spring plate, the rail and the rail support.

Any suitable means may be provided to insure maintenance of the operative position of the plate D relative to the rail and the tie plate. For example, the tie plate may be provided with a suitable socket formation to accommodate the outer end of the portion $d'$ of said plate and to thus, in cooperation with the fastener E, hold said plate against outward and sidewise movement. In this connection and as illustrated in Figs. 1 to 3 of the drawing, the outer end of the portion $d'$ of the plate D may be turned downwardly, as indicated at $d^3$, and may be engaged in a recess or depression $b'$ pressed, rolled or formed in any other suitable manner in the tie plate; or, as illustrated in Fig. 4 of the drawing, the tie plate B may be provided with an upstanding rib $b^2$ defining a socket of U-shape to accommodate the outer end of the portion $d'$ of the plate D which portion $d'$ may be either downwardly turned or flat as desired. Obviously the rib $b^2$ may be either an integral part of the tie plate or a part separate from the tie plate welded or other secured thereto.

The manner in which the said fastener E straddles the clip inherently holds the same against twisting out of right-angular relation to the base flange of the rail, and furthermore, makes it possible to use an imperforate clip which is stronger and more durable than clips which require penetration by a fastener. Moreover, the staple does not lift under the wave motion of the rail as easily as a spike because one leg thereof counteracts the tendency of the other to lift. Also, when it is desired to remove old rail and replace it with new, it is not necessary to remove the fastener from the tie, thus avoiding "spike-killing" of the tie, which renders it useless, and reduces tie replacement to a minimum, thereby economizing in the greatest single item of expense in road bed maintenance. That is to say, the spring clip can be removed from beneath the tie-embedded fastener by prying up its outer end slightly and then forcing the clip out with a claw bar using the head of the rail as a fulcrum.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. Rail holding means, comprising, the rail, a tie plate upon which the rail rests, a rib projecting upwardly from the tie plate and constituting an abutment for one edge of the base flange of the rail, an initially arched imperforate spring clip seated at its outer end upon the tie plate at a point spaced outwardly from said rib and seated at its inner end upon the upper face of the base flange of the rail at a point spaced inwardly from the outer edge of the said base flange, the medial part of said clip including an outwardly and downwardly extending step portion, and fastening means having a portion thereof engaging the upper face of said step portion and holding the lower part of said step portion in rigid engagement with the rib whereby said rib serves as a stop to limit compression of the clip under pressure of the fastening means, and the fastening and rib provide a fulcrum for the portion of the clip between its inner end and the step portion, said clip, between its inner end and the point where it engages the rib of the tie plate, having clearance from the top face of the rail flange to permit normal wave motion of the rail while the latter is engaged by the inner end portion of the clip and any tendency of the rail to move abnormally upwardly from the tie plate is prevented.

2. Rail holding means, comprising, the rail, a tie plate upon which the rail rests, a rib projecting upwardly from the tie plate and constituting an abutment for one edge of the base flange of the rail, said rib having a vertical fastening receiving opening, an initially arched imperforate spring clip seated at its outer end upon the tie plate at a point spaced outwardly from said rib and seated at its inner end upon the upper face of the base flange of the rail at a point spaced inwardly from the outer edge of said base flange, said clip having a medially outwardly and downwardly extending step portion, and fastening means for flexing the clip into rail-gripping position, said means extending through the opening in said rib into the tie and in vertical alinement with said rib, said means also having a portion engaging the upper face of the step portion of the clip above said rib and holding the lower face of the step portion of said clip rigidly against said rib, the said fastening means freely passing through the opening in the rib and embedded in the tie.

3. Rail holding means, comprising, the rail, a tie, a tie plate upon which the rail rests, a shoulder projecting upwardly from the tie plate and constituting an abutment for one side of the base flange of the rail, said tie plate having an opening passing through the shoulder, an imperforate arched spring clip seated at its outer end upon the tie plate at a point spaced outwardly from said shoulder and seated at its inner end upon the upper face of the base flange of the rail at a point spaced inwardly from the outer edge of the said base flange, and holding means engaging the upper face of said arched spring clip and having a shank portion disposed at one side of the edge of the clip and passing through the opening in the tie plate and into the tie for compressing the clip downwardly to cause its lower face to bear against the upper portion of the shoulder which serves as a stop to limit compression of the clip under pressure of the fastening means, said fastening means and shoulder cooperating to provide a fulcrum for the portion of the clip between its inner end and the shoulder to yieldably engage the upper side of the base flange of the rail to permit normal wave motion of the rail.

4. Rail holding means, comprising, in combination, the tie, the rail, a tie plate on the tie and supporting the rail, an upstanding shoulder on the tie plate constituting an abutment for one edge of the base flange of the rail, said plate having fastening receiving openings at the location of the shoulder, an upwardly arched imperforate strip constituting an elongated spring metal clip having its inner end engaging the upper face of the base flange of the rail and its outer end engaging the tie plate, and a staple fastener straddling the clip intermediate its ends and passing through the openings in the tie plate shoulder to enter the tie, said fastener flexing the medial flat underside of the spring clip into abutting engagement with the shoulder.

RICHARD T. SCHOLES.